US009021902B2

(12) United States Patent
Chu et al.

(10) Patent No.: US 9,021,902 B2
(45) Date of Patent: May 5, 2015

(54) CENTRAL TRANSMISSION DEVICE FOR A FOUR-WHEEL STEERING SYSTEM

(75) Inventors: Chia-Chun Chu, Tainan (TW); Deng-Maw Lu, Tainan (TW)

(73) Assignee: Southern Taiwan University, Tainan (TW)

( * ) Notice: Subject to any disclaimer, the term of this patent is extended or adjusted under 35 U.S.C. 154(b) by 534 days.

(21) Appl. No.: 13/359,752

(22) Filed: Jan. 27, 2012

(65) Prior Publication Data

US 2013/0087001 A1 Apr. 11, 2013

(30) Foreign Application Priority Data

Oct. 5, 2011 (TW) .............................. 100136051 A

(51) Int. Cl.
*B62D 3/02* (2006.01)
*B62D 7/15* (2006.01)

(52) U.S. Cl.
CPC ........... *B62D 7/1527* (2013.01); *Y10T 74/1836* (2015.01); *Y10T 74/18408* (2015.01); *Y10T 74/2111* (2015.01); *Y10T 74/2115* (2015.01)

(58) Field of Classification Search
CPC ............................ B62D 7/1527; B62D 7/1518
USPC ............... 74/63, 68, 69, 570.1, 570.2, 570.21
See application file for complete search history.

(56) References Cited

U.S. PATENT DOCUMENTS

| 2,333,611 | A | * | 11/1943 | Wolf .............................. 464/103 |
| 2,932,255 | A | * | 4/1960 | Neukirch ....................... 417/429 |
| 3,394,783 | A | * | 7/1968 | Searle ........................... 192/21.5 |
| 3,418,858 | A | * | 12/1968 | Minnich ............................ 74/68 |
| 4,105,086 | A | | 8/1978 | Ishii et al. |
| 4,452,592 | A | * | 6/1984 | Tsai .............................. 464/102 |
| 4,572,316 | A | | 2/1986 | Kanazawa et al. |
| 4,813,694 | A | * | 3/1989 | Boberg et al. ................. 180/409 |
| 4,957,183 | A | | 9/1990 | Mullett et al. |
| 5,307,891 | A | | 5/1994 | Shaw et al. |
| 5,341,294 | A | | 8/1994 | Kanazawa et al. |
| 5,667,032 | A | | 9/1997 | Kamlukin |
| 8,100,422 | B1 | | 1/2012 | Chu et al. |

* cited by examiner

*Primary Examiner* — William Kelleher
*Assistant Examiner* — Emily Cheng
(74) *Attorney, Agent, or Firm* — Birch, Stewart, Kolasch & Birch, LLP

(57) ABSTRACT

A four-wheel steering central transmission device includes an input shaft extending through a front wall of a housing and having an input rotary disc formed with a first slide groove. A turning output unit includes an output shaft extending through a rear wall of the housing and having an output rotary disc formed with a second slide groove. A transmission unit disposed between the input and output shafts includes a hollow adjustment block disposed adjustably within the housing and movable leftward or rightward, and a transmission member movable within the adjustment block and having slide pieces inserted respectively and slidably into the first and second slide grooves.

8 Claims, 9 Drawing Sheets

CENTRAL TRANSMISSION DEVICE FOR A FOUR-WHEEL STEERING SYSTEM

CROSS REFERENCE TO RELATED APPLICATION

This application claims priority of Taiwanese Patent Application No. 100136051 filed on Oct. 5, 2011.

BACKGROUND OF THE INVENTION

1. Field of the Invention

The invention relates to a central transmission device of a four-wheel steering system, and more particularly to a mechanical type central transmission device for a four-wheel steering system.

2. Description of the Related Art

The concept of four-wheel steering (abbreviated as 4WS) has long been applied to the structures of the farming vehicles such as tractors, mowers, harvesters, etc., to facilitate movements in narrow, muddy and uneven farmland and country roads. The concept of four-wheel steering is also applied to passenger vehicles. When a 4WS vehicle is driven at a low speed, or steered to turn by a large angle, the front and rear wheels are turned in opposite directions to reduce the turning radius and to increase the vehicle's agility for roadside parking and turning. When the vehicle is driven at high speed or steered to turn by a small angle, the front and rear wheels are turned in the same direction to reduce lateral swinging of the vehicle body and to increase stability when changing driving lanes and driving at high speed.

Generally speaking, a four-wheel steering system primarily includes a front wheel turning mechanism, a rear wheel turning mechanism and a central transmission device connecting the front wheel turning mechanism and the rear wheel turning mechanism. The central transmission device includes a mechanical type and an electronic type. Since the mechanical-type central transmission device has better durability, better stability, and impact resistance, and is less susceptible to damage from ambient environmental conditions, the mechanical type central transmission device is relatively popular in research and development.

A mechanical type central transmission device can receive an angular displacement input from the front wheel turning mechanism and transmit a subsequent displacement output to the rear wheel turning mechanism. The structures and operating mechanisms of central transmission devices can be categorized into a swinging arm type (as disclosed in U.S. Pat. Nos. 4,572,316 and 5,341,294), a lever linkage type (as disclosed in U.S. Pat. No. 4,105,086), a cam type (as disclosed in U.S. Pat. No. 4,957,183), a gear type (as disclosed in U.S. Pat. No. 5,307,891), and other types (as disclosed in U.S. Pat. No. 5,667,032). However, all the foregoing types of central transmission devices suffer from the drawbacks of complicated structure, complex assembly, large size, poor transmission reliability, difficulty in coupling with the present vehicle structures, etc. Accordingly, improvements may be made to the conventional four wheel steering system.

SUMMARY OF THE INVENTION

Therefore, the object of the present invention is to provide a central transmission device for a four-wheel steering system that has a simple structure, easy assembly, small size, high reliability, and high adaptability.

According to the present invention, a central transmission device of a four-wheel steering system comprises a housing, a turning input unit, a turning output unit and a transmission unit. The housing has front and rear walls. The turning input unit includes an input shaft that extends rotatably through the front wall and that has a front end adapted for connection with a front wheel turning mechanism, and an input rotary disc disposed at a rear end of the input shaft within the housing. The input disc has a rear end face formed with a first slide groove extending diametrically. The turning output unit includes an output shaft that extends rotatably through the rear wall and that has a rear end adapted for connection with a rear wheel turning mechanism, and an output rotary disc disposed at a front end of the output shaft within the housing and having a front end face formed with a second slide groove extending diametrically. The transmission unit is disposed between the input and output shafts, and includes a hollow adjustment block that is disposed movably within the housing to move leftwards or rightwards, and a transmission member that has a moving body movable within and relative to the adjustment block, and two slide pieces projecting oppositely from the moving body and inserted respectively into the first and second slide grooves. Each of the slide pieces is slidable along a respective one of the first and second slide grooves. When the adjustment block is moved and adjusted in position within the housing, each of the slide pieces can be set at a predetermined position within the respective one of the first and second slide grooves to vary a relationship between turning angles of the input and output shafts.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
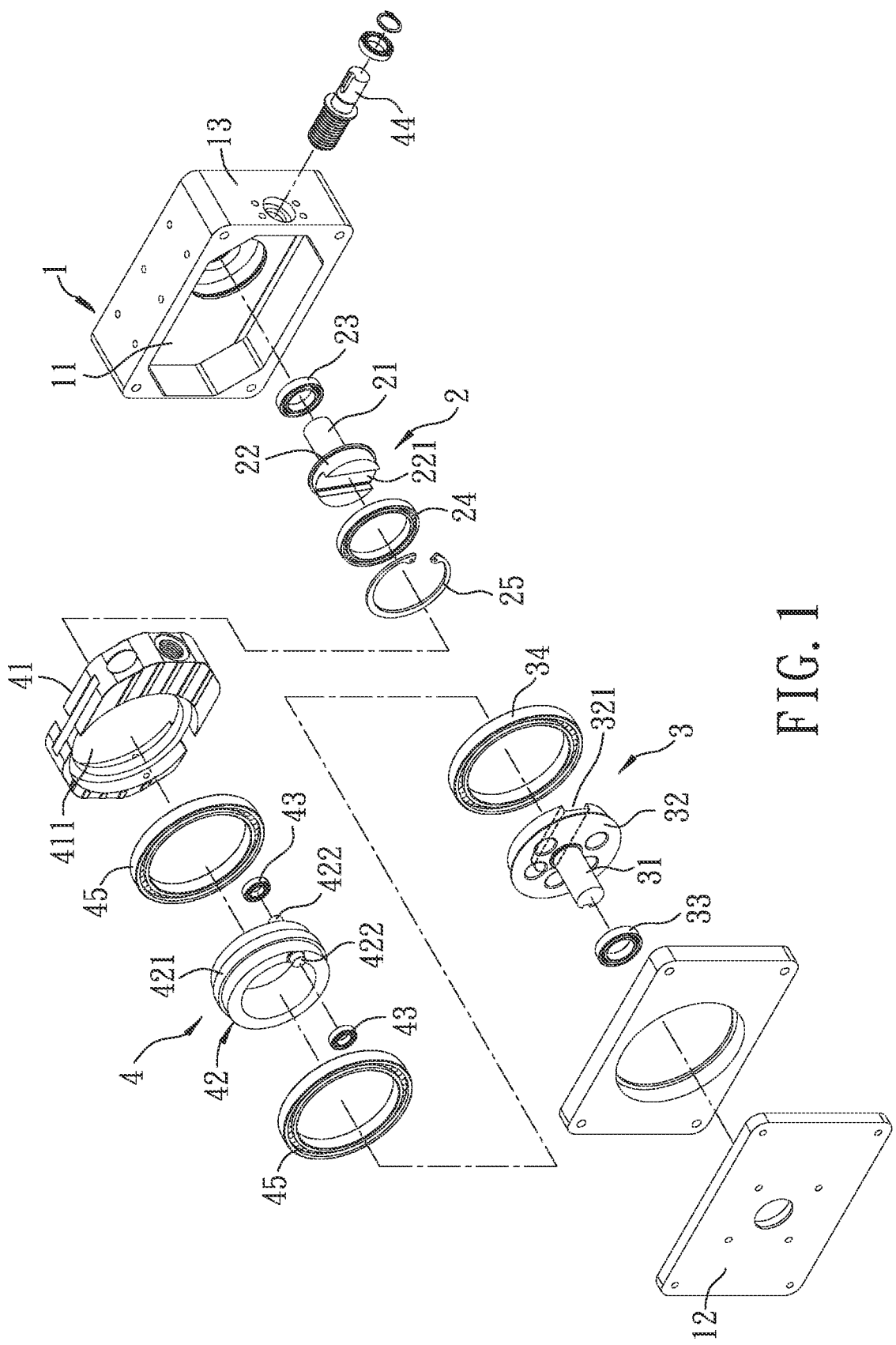
FIG. 1 is an exploded perspective view of a central transmission device of a four-wheel steering system according to the first preferred embodiment of the present invention.

Before the present invention is described in greater detail with reference to the accompanying preferred embodiments, it should be noted herein that like elements are denoted by the same reference numerals throughout the disclosure.

Figure 2:
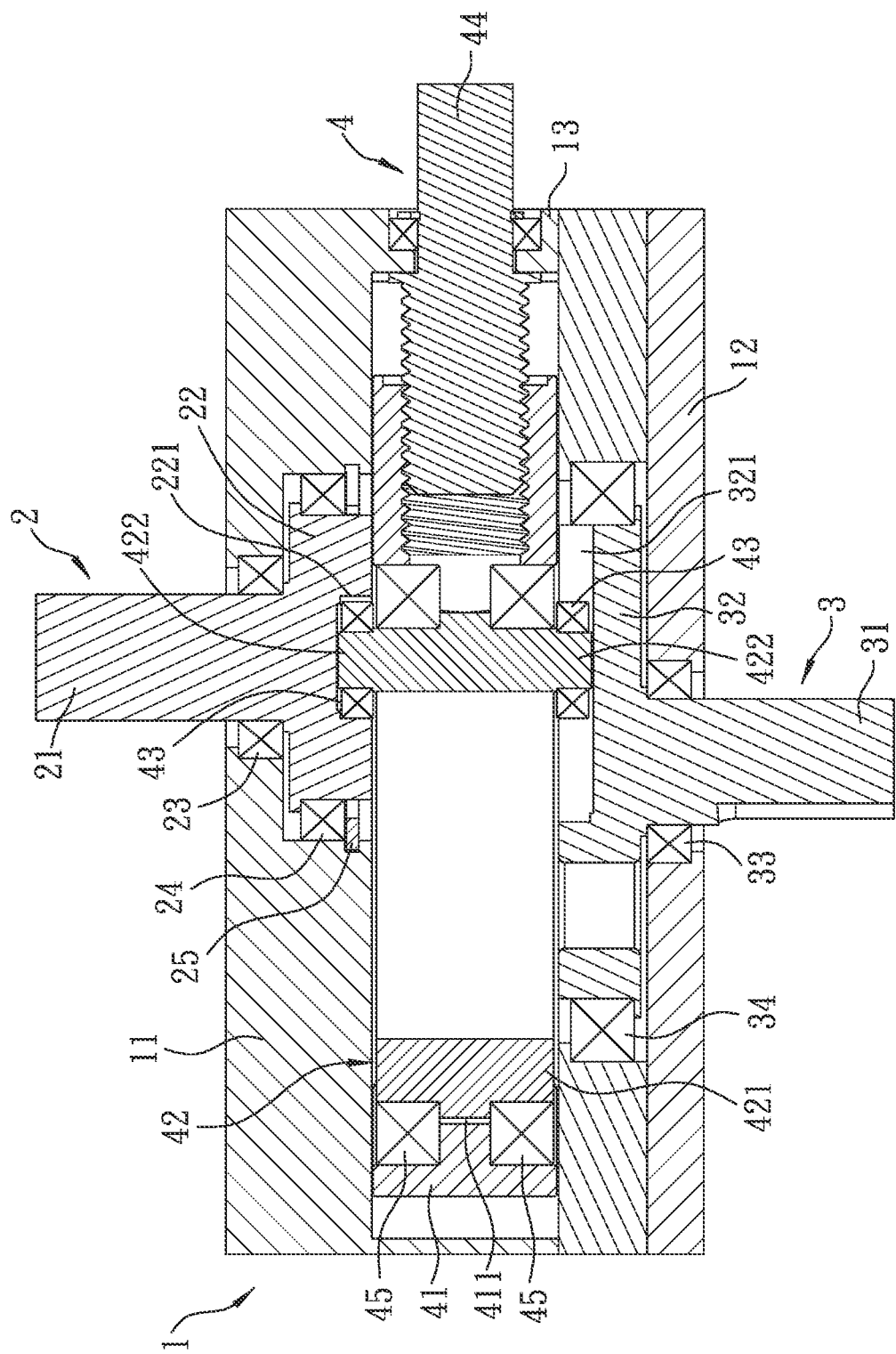
FIG. 2 is a sectional plan view of the first preferred embodiment.
Figure 3:
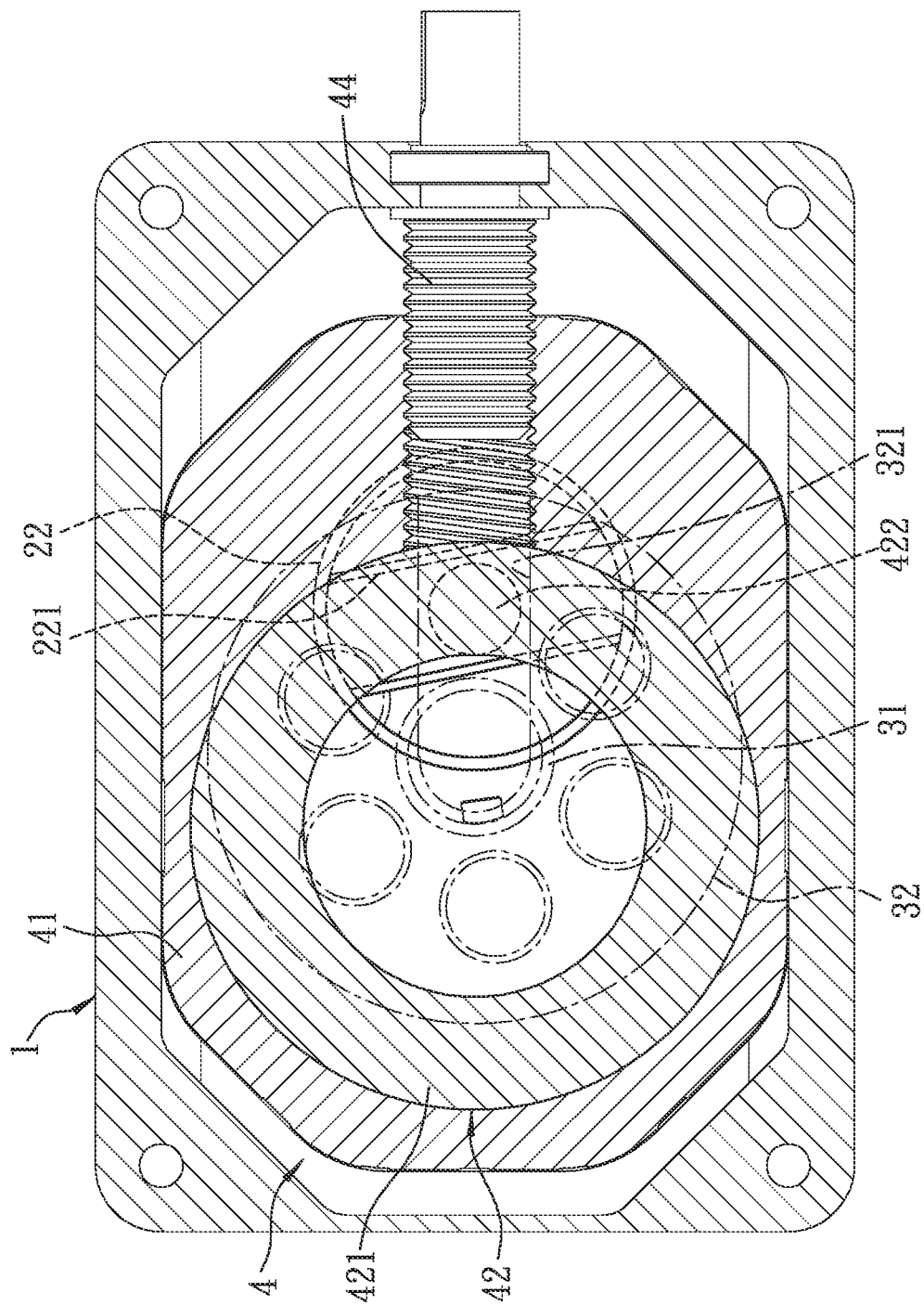
FIG. 3 is a sectional elevation view of the first preferred embodiment.

Referring to FIGS. 1 to 3, a central transmission device for a four-wheel steering system according to the first preferred embodiment of the present invention is connected between a front wheel turning mechanism (not shown in the Figure) and a rear wheel turning mechanism (not shown in the Figure) of a vehicle. Since the structures of the front wheel turning mechanism and the rear wheel turning mechanism are well known to those skilled in the art, they are not detailed hereinafter.

The central transmission device of this invention includes a rectangular housing 1, a turning input unit 2 that extends through a front wall 11 of the housing 1 and that is adapted for connection with the front wheel turning mechanism, a turning output unit 3 that extends through a rear wall 12 of the housing 1 and that is adapted for connection with the rear wheel turning mechanism, and a transmission unit 4 disposed in the housing 1 and connected between the turning input unit 2 and the turning output unit 3.

The turning input unit 2 includes an input shaft 21 that extends rotatably through the front wall 11, an input rotary disc 22 disposed coaxially at a rear end of the input shaft 21 within the housing 1, a first bearing 23 disposed between the front wall 11 and the input shaft 21, a second bearing 24 disposed between the front wall 11 and the input rotary disc 22, and a clamp ring 25 disposed between the front wall 11 and the input rotary disc 22 in abutment with the second bearing 24. The input shaft 21 has a front end adapted for coaxial connection with the front wheel turning mechanism. The input rotary disc 22 has a rear end face formed with a first slide groove 221 extending diametrically and having two opposite open ends. In this embodiment, the first slide groove 221 has substantially the same length as a diameter of the input rotary disc 22, and two opposite ends of the first slide groove 221 extend to the circumference of said output rotary disc.

The turning output unit 3 includes an output shaft 31 that extends rotatably through the rear wall 12, an output rotary disc 32 disposed at a front end of the output shaft 31 within the housing 1, a third bearing 33 disposed between the rear wall 12 and the output shaft 31, and a fourth bearing 34 disposed between the rear wall 12 and the output rotary disc 32. The output shaft 31 extends parallel to the input shaft 21 and has a rear end adapted for coaxial connection with the rear wheel turning mechanism. The output rotary disc 32 has a front end face formed with a second slide groove 321 extending diametrically and having one open end. The diameter of the output rotary disc 32 is larger than that of the input rotary disc 22. In this embodiment, the second slide groove 321 has an inner end located substantially at a center of the output rotary disc 32. An outer end of the second slide groove 321 extends to the circumference of the output rotary disc 32. However, the length of the second slide groove 321 should not be limited only thereto and may be larger than a radius or substantially the same as a diameter of the output rotary disc 32.

The transmission unit 4 includes a hollow adjustment block 41 that is disposed movably within the housing 1 to move leftwards or rightwards, a transmission member 42 that is disposed in and is movable relative to the adjustment block 41, two fifth bearings 43 and two sixth bearings 45. The adjustment block 41 has front and rear sides respectively facing the input and output rotary discs 22, 32, and a receiving space 411 opening at the front and rear sides of the adjustment block 41. In this embodiment, the receiving space 411 has a cylindrical shape. The transmission member 42 has a moving body 421 movable relative to the adjustment block 41 within the receiving space 411, and two slide pieces 422 projecting oppositely from opposite front and rear sides of the moving body 421. The slide pieces 422 are in line with each other and parallel to the input shaft 21 and are inserted slidably and respectively into the first and second slide grooves 221, 321. In this embodiment, the moving body 421 is formed as an annular ring, and the slide pieces 422 are eccentric to the axis of the moving body 421. When the moving body 421 is rotated, the slide pieces 422 are rotated about a central axis of the moving body 421. The fifth bearings 43 are respectively sleeved around the slide pieces 422. The front one of the slide pieces 422 and the corresponding fifth bearing 43 are together inserted slidably into the first slide groove 221. The rear one of the slide pieces 422 and the corresponding fifth bearing 43 are together inserted slidably into the second slide groove 321. The sixth bearings 45 are spaced apart from each other and are disposed between the moving body 421 and the inner surface of the adjustment block 41.

The transmission unit 4 further includes an adjuster rod 44 extending rotatably through a sidewall 13 of the housing 1. The adjuster rod 44 has an inner end inserted threadedly into the adjustment block 41 and an outer end protruding out of the housing 1. When the outer end of the adjuster rod 44 is rotated, the adjustment block 41 is moved relative to the housing 1 leftwards or rightwards. As such, the position of the adjustment block 41 inside the housing 1 can be adjusted. When the position of the adjustment block 41 is adjusted, the moving body 421 is moved adjusting the positions of the slide pieces 422 in the respective first and second slide grooves 221, 321.

During the operation of the front wheel turning mechanism which incorporates the central transmission device of the present invention, rotation of a steering wheel and two front wheels provide a displacement input, which is transmitted to the input shaft 21 so that the input rotary disc 22 rotates together with the input shaft 21 synchronously. Because the two slide pieces 422 of the transmission member 42 are inserted into the first and second slide grooves 221, 321, the input rotary disc 22 drives rotation of the moving body 421 of the transmission member 42, which in turn drives the output rotary disc 32 to rotate. Accordingly, the output shaft 31 co-rotates with the output rotary disc 32 and generates a turning angle, which is transmitted to the rear wheel turning mechanism.

By adjusting the position of the adjustment block 41, the positions of the two slide pieces 422 in the first slide groove 221 and the second slide groove 321 can be adjusted to vary the functional relationship between rotation angles of the input and output shafts 21, 31. For instance, the ratio of the turning angle of the output shaft 31 to the turning angle of the input shaft 21 can be increased or decreased. Furthermore, an equal phase turning relation between the input and output shafts 21, 31 can be changed into a reverse phase turning relation between the input and output shafts 21, 31.

Figure 4:
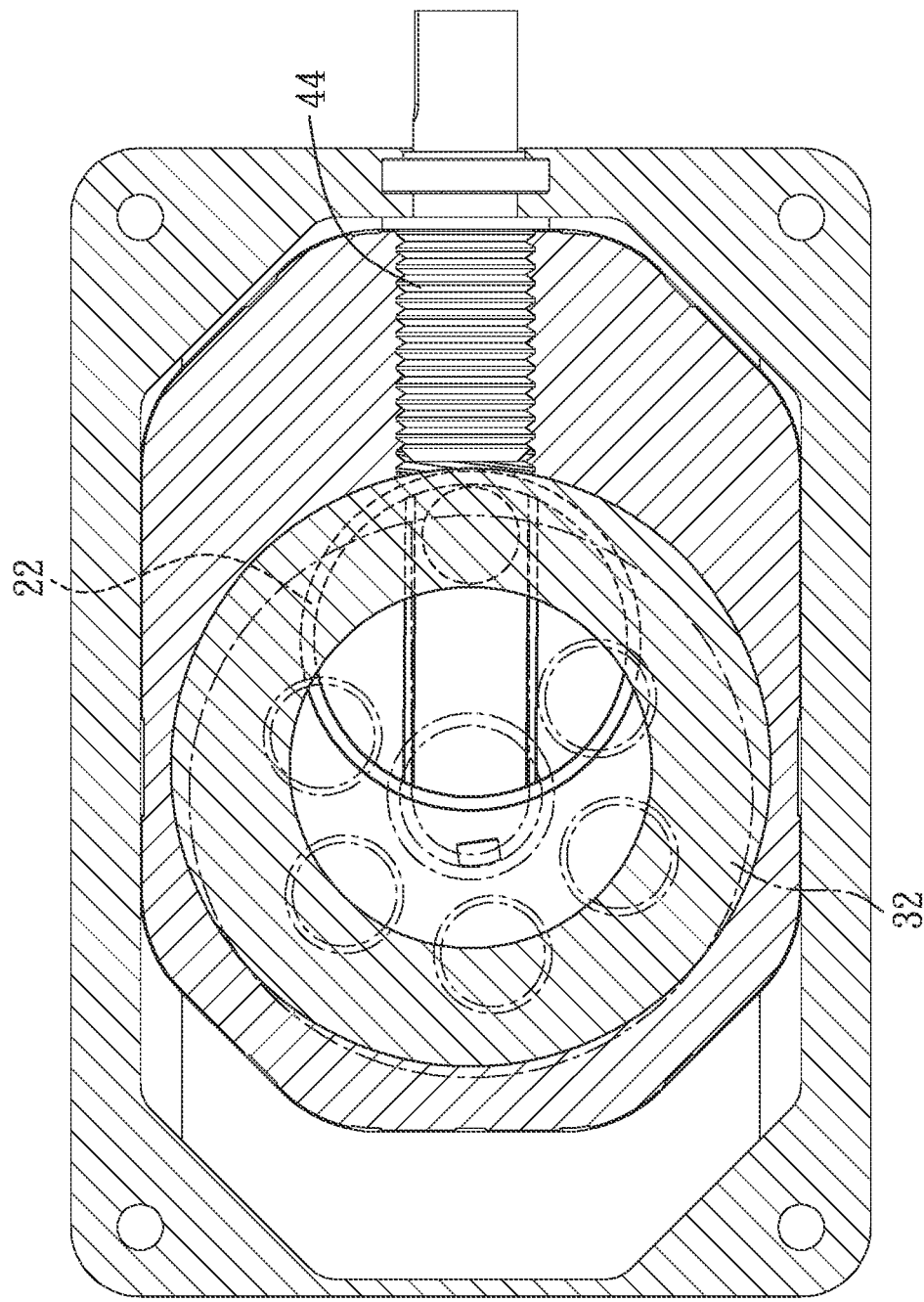
FIG. 4 is the same view as FIG. 3, but showing that an adjustment block shifts to the right.

Referring to FIG. 3, the adjustment block 41 is at a relatively left position inside the housing 1. The length direction of the first slide groove 221 is transverse to that of the second slide groove 321. The slide piece 422 at the front of the moving body 421 is in an intermediate part of the first slide groove 221, and the slide piece 422 at the rear of the moving body 421 is also at an intermediate part of the second slide groove 321. Referring to FIG. 4, when the adjuster rod 44 is rotated to move the adjustment block 41 rightward, the moving body 421 is moved rightward so that the slide piece 422 disposed in the first slide groove 221 causes the input rotary disc 22 to rotate. Accordingly, the first slide groove 221 and the second slide groove 321 become substantially parallel, and the slide pieces 422 move to the right sides of the first and second slide grooves 221, 321, respectively.

Figure 5:
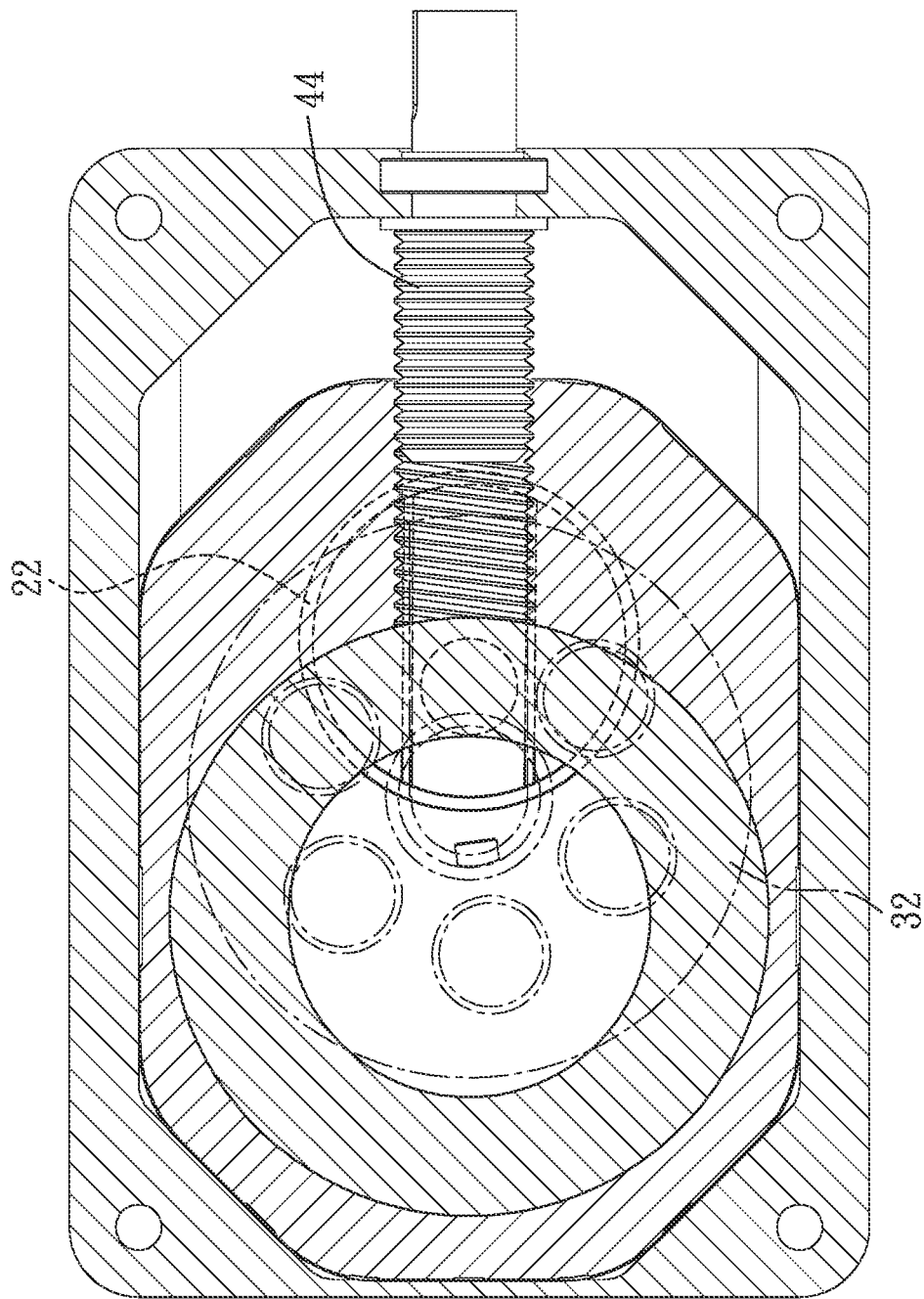
FIG. 5 is the same view as FIG. 3, but showing that an adjustment block shifts to the left.

When the adjustment block 41 is in the position shown in FIG. 3, the input shaft 21 is rotated, but the output shaft 31 is not rotated. The input and output shafts 21, 31 can be turned in the same directions (equal phase turning) when the adjustment block 41 is in the position shown in FIG. 4, and in opposite directions (reverse phase turning) when the adjustment block 41 is in the position shown in FIG. 5. U.S. patent application Ser. No. 12/888,074, which is assigned to the assignee of the present application and which describes reverse phase and equal phase rotation operations of input and output shafts, is incorporated herein by reference.

Apart from being easy for adjustment with respect to the functional relationship between rotating angles of the input and output shafts 21, 31, the central transmission device according to the invention has a simple structure, easy assembly, small size, high reliability, and high adaptability.

Figure 6:
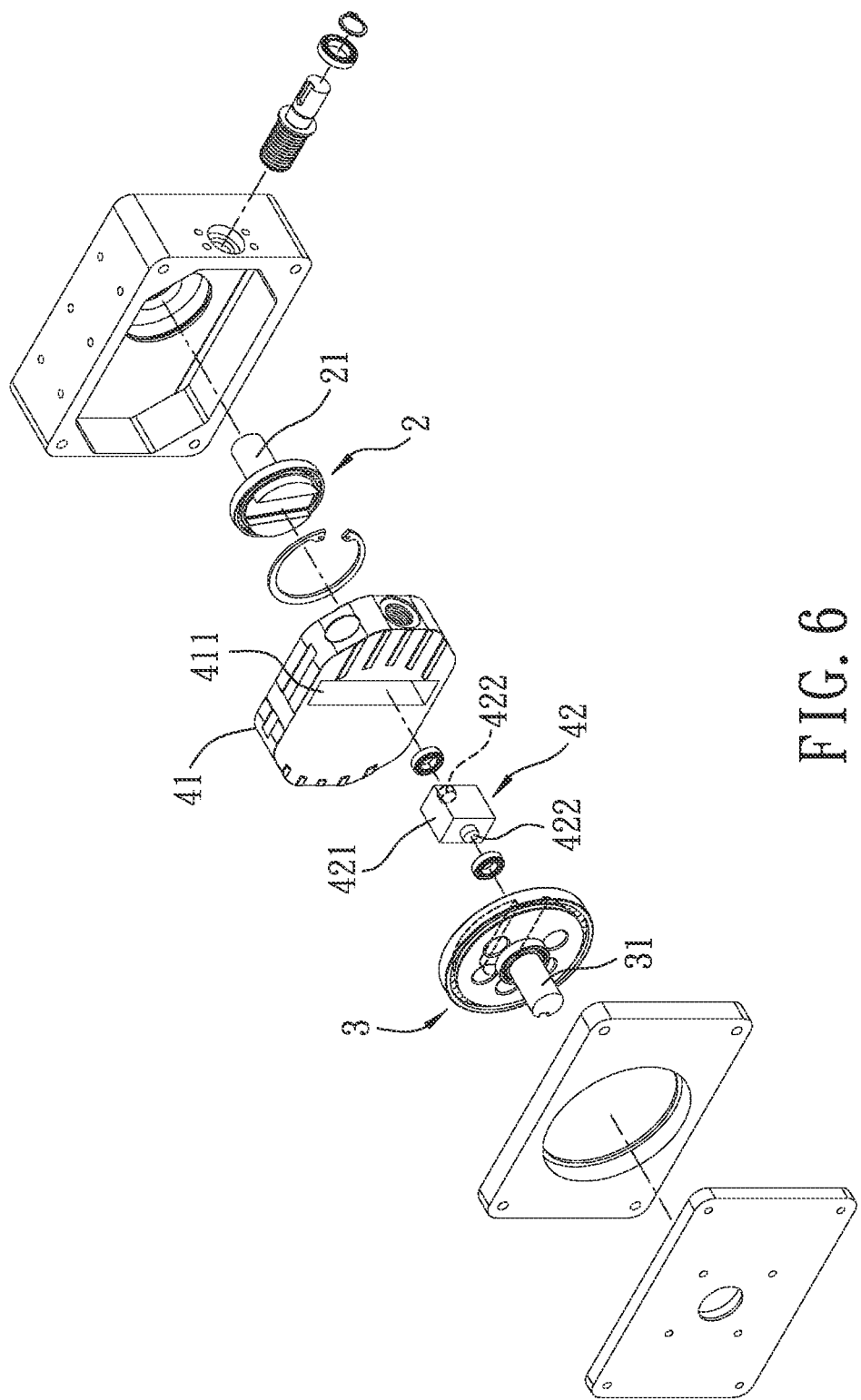
FIG. 6 is an exploded perspective view of a central transmission device of a four-wheel steering system according to the second preferred embodiment of the present invention.
Figure 7:
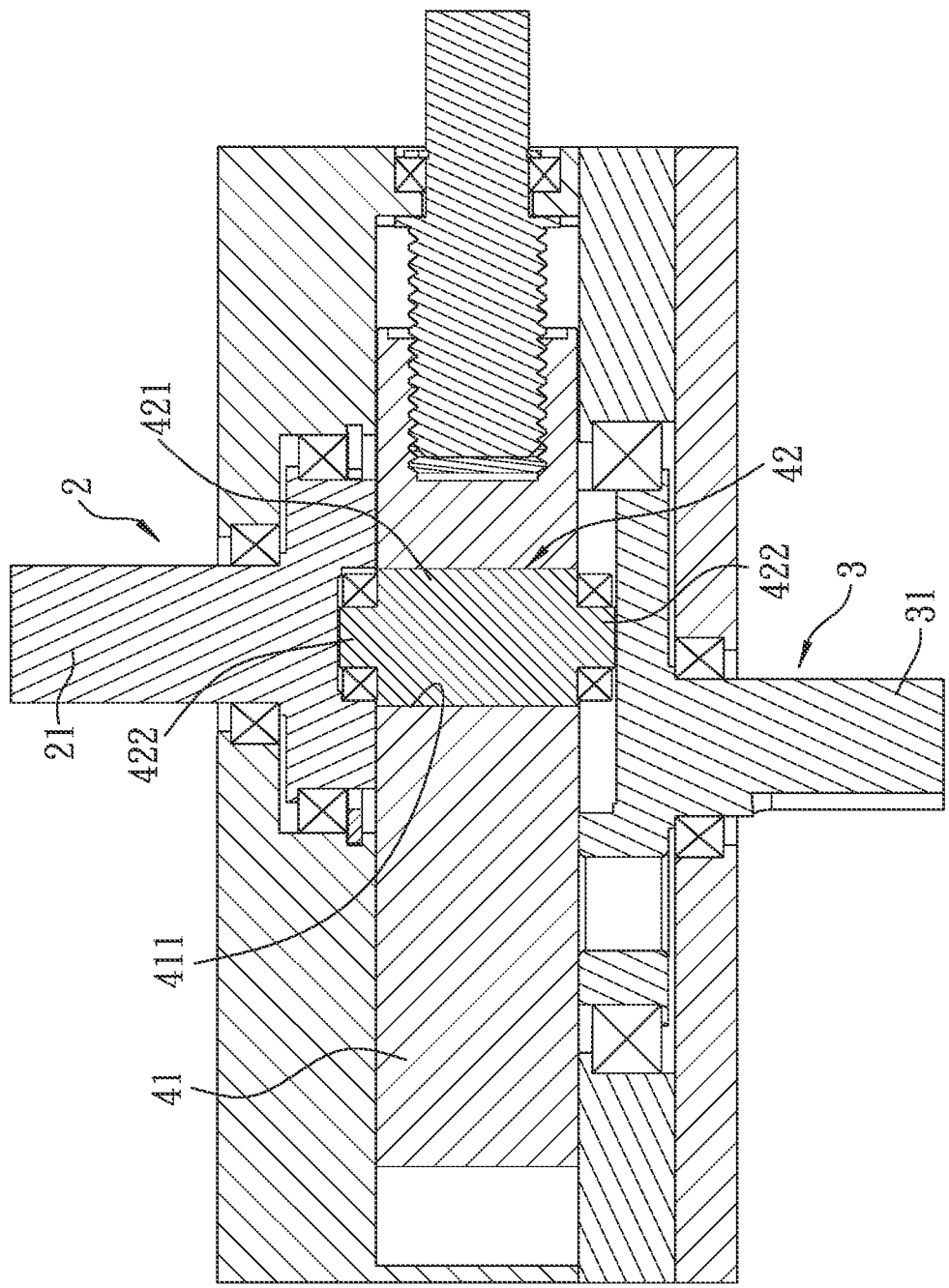
FIG. 7 is a sectional plan view of the second preferred embodiment.

Referring to FIGS. 6 and 7, a central transmission device of a four-wheel steering system according to the second preferred embodiment of this invention is generally the same as the first preferred embodiment. However, the receiving space 411 of the adjustment block 41 has a rectangular shape in this embodiment. The moving body 421 of the transmission member 42 also has a rectangular shape, but has a height smaller than that of the receiving space 411. The two slide pieces 422 project from two opposite front and rear sides of the moving body 421 respectively.

When the turning input unit 2 rotates, the moving body 421 of the transmission member 42 is driven to move upward or downward inside the receiving space 411, and thereby drives the turning output unit 3 to turn.

Figure 8:
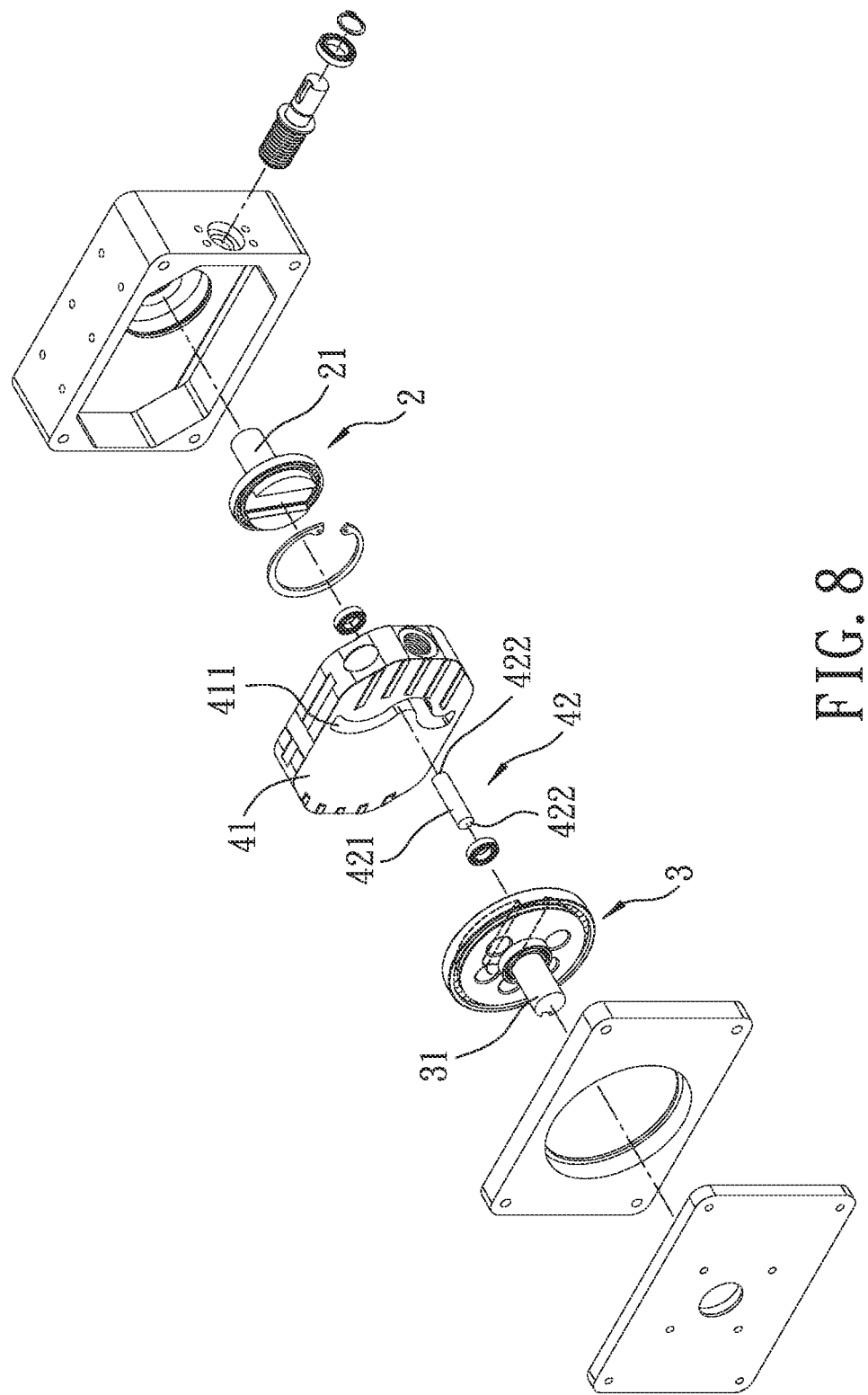
FIG. 8 is an exploded perspective view of a central transmission device of a four-wheel steering system according to the third preferred embodiment of the present invention.
Figure 9:
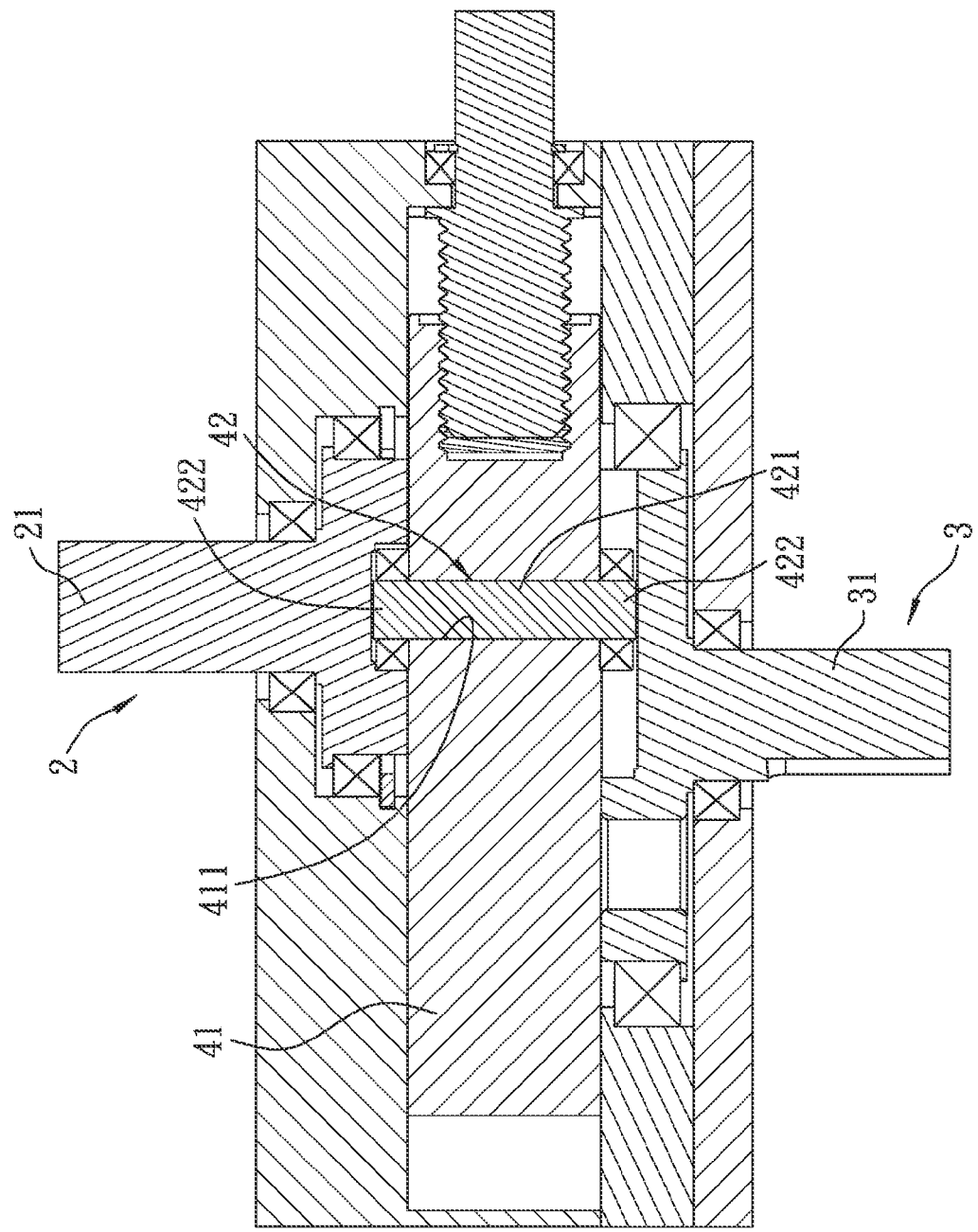
FIG. 9 is a sectional plan view of the third preferred embodiment.

Referring to FIGS. 8 and 9, the third preferred embodiment of the invention is generally the same as the first preferred embodiment. However, the receiving space 411 of the adjustment block 41 in this embodiment has a curved shape that extends curvedly in a top-bottom direction. The moving body 421 of the transmission member 42 is in the form of a cylindrical rod. The two slide pieces 422 are formed at front and rear ends of the cylindrical rod.

When the turning input unit 2 rotates, the moving body 421 of the transmission member 42 is driven to move upward or downward inside the receiving space 411, and thereby drives the turning output unit 3 to turn.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A central transmission device of a four-wheel steering system, comprising:

a housing having front and rear walls;

a turning input unit including an input shaft that extends rotatably through said front wall and that has a front end adapted for connection with a front wheel turning mechanism, and an input rotary disc disposed at a rear end of said input shaft within said housing, said input rotary disc having a rear end face formed with a first slide groove extending diametrically;

a turning output unit including an output shaft that extends rotatably through said rear wall and that has a rear end adapted for connection with a rear wheel turning mechanism, and an output rotary disc disposed at a front end of said output shaft within said housing and having a front end face formed with a second slide groove extending diametrically; and a transmission unit disposed between said input and output rotary discs, and including a hollow adjustment block that is disposed movably within said housing to move leftwards or rightwards, and a transmission member that has a moving body movable within and relative to said hollow adjustment block, and two slide pieces projecting oppositely from said moving body and inserted respectively into said first and second slide grooves, each of said slide pieces being slidable along a respective one of said first and second slide grooves, wherein, when said hollow adjustment block is moved and adjusted in position within said housing, each of said slide pieces can be set at a predetermined position within the respective one of said first and second slide grooves to vary a relationship between turning angles of said input and output shafts, wherein said hollow adjustment block has front and rear sides respectively facing said input and output rotary discs, and a receiving space that opens at said front and rear sides, said moving body being movable in said receiving space, said slide pieces being in line with each other and parallel to said input and output shafts, and wherein said receiving space extends curvedly in a top-bottom direction, said moving body being formed as a cylindrical rod extending through said receiving space, said moving body moving upward and downward along said receiving space, two opposite ends of said cylindrical rod being formed as said slide pieces, respectively.

2. The central transmission device of claim 1, wherein said housing further has a sidewall interconnecting said front and rear walls, said transmission unit further including an adjuster rod extending rotatably through said sidewall and having an inner end engaging threadedly said hollow adjustment block, said hollow adjustment block being moved when said adjuster rod is rotated.

3. The central transmission device of claim 1, wherein said input shaft and said input rotary disc are coaxial, said output shaft and said output rotary disc are coaxial, and said input and output shafts extend along parallel lines.

4. The central transmission device of claim 3, wherein said turning input unit further includes a first bearing disposed between said front wall and said input shaft, a second bearing disposed between said front wall and said input rotary disc, and a clamp ring disposed between said front wall and said input rotary disc in abutment with said second bearing.

5. The central transmission device of claim 4, wherein said turning output unit further includes a third bearing disposed between said rear wall and said output shaft, and a fourth bearing disposed between said rear wall and said output rotary disc.

6. The central transmission device of claim 3, wherein said transmission unit further includes two fifth bearings, each of which is disposed around a respective one of said slide pieces within a respective one of said first and second slide grooves.

7. The central transmission device of claim 1, wherein said second slide groove has an inner end located substantially at a center of said output rotary disc, and an outer end extending to a circumference of said output rotary disc.

8. The central transmission device of claim 7, wherein said first slide groove has two opposite ends extending to a circumference of said input rotary disc.

* * * * *